Nov. 29, 1960  J. C. BELLAMY  2,962,710
SYSTEM AND APPARATUS FOR MEASURING INTERVALS
Filed June 7, 1954  4 Sheets-Sheet 1

FIG. 1

INVENTOR.
John C. Bellamy
BY
Thiess, Olson, Mecklenburger,
von Holst, & Coltman.

Nov. 29, 1960     J. C. BELLAMY     2,962,710
SYSTEM AND APPARATUS FOR MEASURING INTERVALS
Filed June 7, 1954     4 Sheets-Sheet 3

Nov. 29, 1960     J. C. BELLAMY     2,962,710
SYSTEM AND APPARATUS FOR MEASURING INTERVALS
Filed June 7, 1954     4 Sheets-Sheet 4

INVENTOR.
John C. Bellamy

United States Patent Office 2,962,710
Patented Nov. 29, 1960

2,962,710

SYSTEM AND APPARATUS FOR MEASURING INTERVALS

John C. Bellamy, Chicago, Ill., assignor, by mesne assignments, to Cook Electric Company, Chicago, Ill., a corporation of Delaware Filed June 7, 1954, Ser. No. 434,977

16 Claims. (Cl. 343—12)

This invention relates to an improved system and apparatus for measuring intervals and more particularly to a system for accurately determining intervals, said system employing a sonic delay line wherein a short accurately determinable linear measure bears a known predetermined relationship to the interval to be ascertained.

It is a principal object of this invention to provide an improved system and apparatus for the determination of intervals and especially for the determination of time intervals, said system employing a novel sonic delay line. Throughout this specification, the term sonic will be used in its broadest sense, meaning one or more longitudinal compressive impulses in matter. The art of time measurement is well developed, and accurate systems of time indication and interval determination are known. However, means for determining short intervals of time and recording the magnitudes thereof are generally of limited range and constitute costly and complex apparatus. One typical means for determining a time interval is by the propagation of electrical energy along a transmission line, and the measurement of the signal position after a time interval is a measure of the interval. Because signals propagate along a transmission line at velocities approaching that of light, such a line must be extremely long for the accommodation of intervals of more than a few microseconds.

It is therefore advantageous to utilize a system of sonic signal propagation whereby short sonic lines may be employed for the determination of relatively long time intervals. One sonic delay line easily adaptable to such an application is constructed of a magnetostrictive material. In such a line an electro-mechanical impulse may be applied to one end of an elongated magnetostrictive line in order to produce a sonic impulse detectable after a predetermined transit time by a sensing coil at the other end of the line. Such a delay line technique measures an elapsed time interval by noting the longitudinal position of the impulse along the line. Thus, for example, in radio altimetry, pulses may be initiated simultaneously on the sonic delay line and in space. The impulse radiated into space reflects from the terrain below and the reflected signal is utilized to generate a second impulse in the line. As is well understood, the time elapsing between the first and second impulses is accurately indicative of the altitude of the aircraft over the terrain. This time may be measured easily by placing a sensing coil on the delay line at such a position that the sonic impulse reaches the sensing coil at the same instant that the reflected impulse returns to the altimeter. A linear representation, namely, the length of delay line between the input and sensing coils represents both the elapsed time between the transmitted and received radio pulses and the height of the aircraft above the ground.

It is therefore a further object of this invention to provide improved apparatus for measuring altitude, the position of cloud formations, and for making other linear measurements to a high degree of accuracy.

It is a further object of this invention to provide improved apparatus for interval measurement which produces automatically a visual indication of the interval and a digital recording of the data produced.

It is a further object of this invention to provide distance measuring apparatus which is more compact, lighter in weight, less expensive, more accurate, and requires less power than any system heretofore known.

It is still another object of this invention to provide an improved sonic delay line and associated apparatus for the utilization thereof.

It is another object of this invention to provide an integrated mechanical scanning system and delay line whereby the instantaneous length of line disposed between an input and a sensing coil may be accurately indicated.

Further and additional objects of this invention will become manifest from a consideration of this specification, the accompanying drawings and the appended claims.

In an exemplary embodiment of this invention an elongated magnetostrictive delay line of rectangular cross section is provided with an input and a sensing coil, each closely wound thereabout in the form of a single helical layer. Associated with said delay line is apparatus for providing periodic input pulses and means for the utilization of output pulses from the sensing coil. The input and the output sensing coils are relatively shiftable. A position pulse generator is associated with the shiftable coil whereby a number of position pulses are produced bearing a known relationship to the distance between said coils.

For a more complete understanding of this invention reference will now be made to the accompanying drawings wherein.

Figure 1:
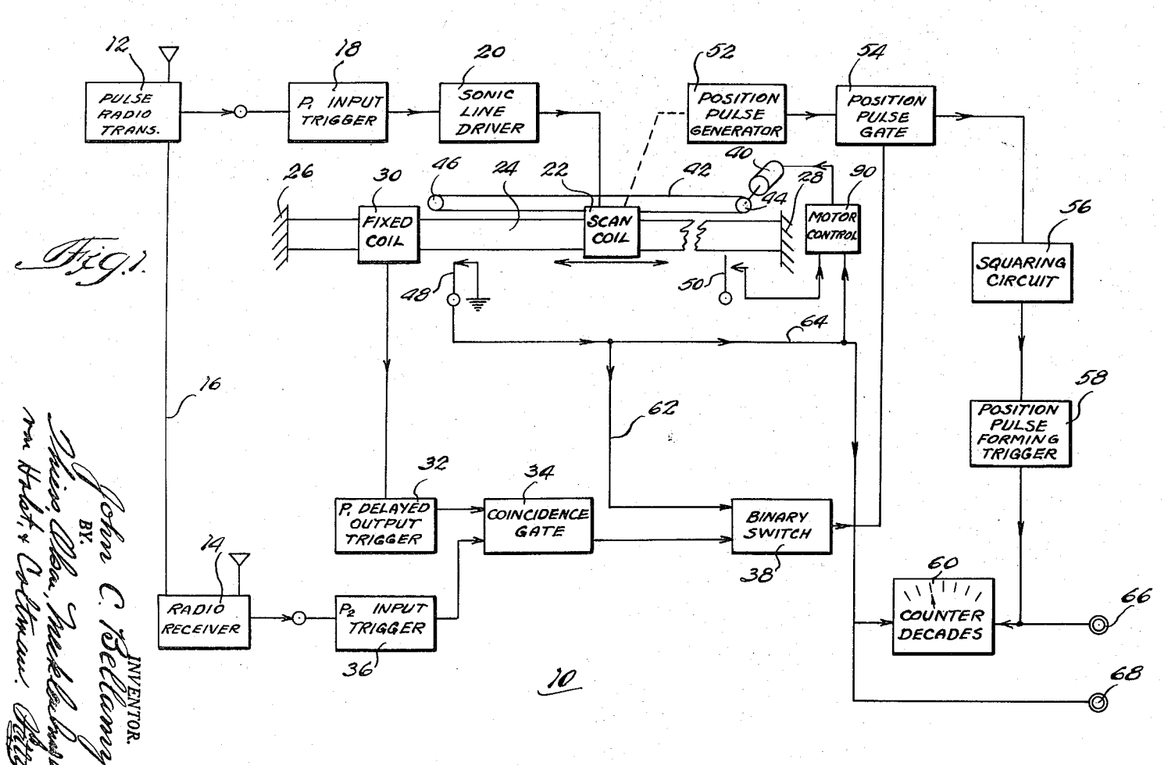
Fig. 1 is a schematic block diagram of one embodiment of this invention.

Referring now to the drawings and more particularly to Fig. 1 a system 10 is illustrated which is adapted for use as a radio altimeter. A radio transmitter 12 provides a pulsed output which is utilized both as a source of radiation directed to the ground below and as a source to trigger the timing apparatus to be described. The radio receiver 14 is provided to receive the reflected signal from the earth which was initially transmitted from transmitter 12. Upon receipt of such impulse, the receiver 14 energizes a second channel of the timing apparatus of this invention and also triggers a second transmitted impulse through the connection 16 which extends between the receiver 14 and the transmitter 12. This triggering may be omitted and the transmitter made self-exciting, if desired.

Transmission of the impulse from transmitter 12 actuates the input trigger 18 which forms a shaped and amplified impulse to excite the sonic line driver 20. The line driver 20 has its output coupled by a transformer to a scanning coil 22 which is movable along a magnetostrictive sonic line 24. The coil 22 is wound about the line 24 and thus a current impulse in the coil produces a longitudinal compressive effect in the line 24 which is propagated in both longitudinal directions as a sonic impulse. Throughout this application the term "sonic" is employed to indicate a mechanical effect and to distinguish specifically over pure electrical phenomenon. It is not to be understood that the impulses impressed on the line 24 are of an audible nature or that they are necessarily repetitive at an audible rate. The line 24 is terminated in mountings 26 and 28 which are adapted to maintain the line 24 under tension as it has been found that the magnetostrictive effect is aggravated by such tensile force. Furthermore, the mountings 26 and 28 provide acoustical damping whereby a minimum reflection will be produced on the line from these terminations.

A second coil 30 very similar to the scanning coil 22 is fixed at a predetermined point along the length of the line 24. In this embodiment the fixed coil 30 is the sensing or output coil but it should be clear that the two coils may be reversed and the fixed coil utilized as an input source. The sonic impulse travelling along line 24 is, in effect, a mechanical stress in the magnetostrictive material which, upon reaching fixed coil 30, causes a fluctuation in the magnetic field thereof sufficient to produce an output signal for actuating output trigger 32. The output trigger 32 will provide a sharp voltage impulse which is applied to a coincidence gate 34. The time at which this impulse is applied to this gate will bear a known relationship to the initial impulse of the radio transmitter 12, the exact interval depending upon the length of the line 24 disposed between coils 22 and 30.

Upon receiving a reflected portion of the pulse propagated from transmitter 12, the radio receiver 14 triggers a second input trigger 36 which also applies a sharp voltage impulse to the coincidence gate 34. When the second coil 22 is positioned on the line 24 so that the impulse from triggers 32 and 36 are applied to the coincidence gate 34 at precisely the same time a gating impulse is produced by the gate 34 which is applied to the binary switch 38 shifting said switch from one stable condition to another. If the scanning coil 22 is at any other position on the line 24 the pulses will not arrive at the gate 34 in synchronism and the gate will remain closed. Thus, the distance between the coils 22 and 30 is an accurate representation of the time required for the radio impulse to travel from the transmitter 12 to the receiver 14. The length of the sonic line may be very accurately measured, the principal accuracy limitation being attributable to the position pulse generator and the coincidence gate, which provide resolution of the order of 1/4000 of an inch of line.

There are various ways in which the scanning coil 22 may be moved or maintained in desired positions. The coil might be moved manually to make periodic determinations of altitude. Alternately a servomechanism or follow-up system may be employed to automatically position the scanning coil 22 at the desired position on the line 24 whereby a continuous indication of altitude is available. A third system for positioning the scanning coil 22 is provided for the embodiment represented in Fig. 1. In the embodiment of Fig. 1 the scanning coil is continuously driven in a reciprocatory manner by a motor schematically shown to be connected to the scan coil through a flexible line 42, a drive pulley 44 and idler pulley 46. The scan coil 22 will be driven at a substantially constant speed between a pair of limit switches 48 and 50. The limit switches 48 and 50 are connected to the motor 40 in a conventional manner through a reversing control 90 whereby the direction of rotation of the motor is reversed each time a switch is engaged to produce the desired reciprocatory motion of the scan coil 22.

Mechanically driven in synchronism with the scan coil 22 is a position pulse generator 52 which generates a series of electrical pulses, each corresponding to an incremental step in the motion of scan coil 22. Thus, as the scan coil moves to the right in Fig. 1 from its starting point adjacent switch 48 a series of impulses is generated in the pulse generator which is applied to the pulse gate 54. The pulse gate 54 is normally open to pass impulses therethrough as the scan coil moves to the right from the starting position but is closed upon receipt of a signal from the binary switch 38 indicating coincidence of the sonic and reflected pulses as described above. As the scanning coil moves to the right, impulses corresponding to length increments pass through the gate and are applied to a squaring circuit 56 and a pulse forming trigger 58. The squared and shaped trigger pulses comprising the output of trigger 58 energize a decade counter 60 which gives a visible indication of the number of pulses passed by the gate 54. The motion of scan coil 22 is at a slow rate compared to the repetition rate of pulse transmitter 12; thus there is approximately one impulse generated by the position pulse generator 52 for each pulse transmitted from the radio 12. This repetition rate determines the resolution of the system and in one particular embodiment of the invention this resolution is approximately .0002 inch of line length which corresponds to approximately 9 feet of altitude. Thus, the number of impulses shown by the counter 60 may be multiplied by the factor 9 to give a direct indication of the altitude of the radio transmitter 12 above the terrain. For convenience this factor may be adjusted to a value of 10. The limit switch 48 which begins the scanning coil 22 on its measuring excursion also provides an impulse through the conductor 62 to the binary switch 38 to reset the same to its initial stable condition and removes the ground from the counters 60 through conductor 64 whereby the counters are reset to receive an additional series of impulses. If a permanent record of the data accumulated is desired, a conventional readout system for the counter decades 60 may be connected between the terminals 66 and 68. In such a readout system an additional series of impulses is applied to the decade counters with said counters connected in parallel relation, the number of impulses required to return each decade to zero being recorded and representing the complement of the digital value originally registered. This is well known counter technique and will not be described in detail.

Figures 2, 3:
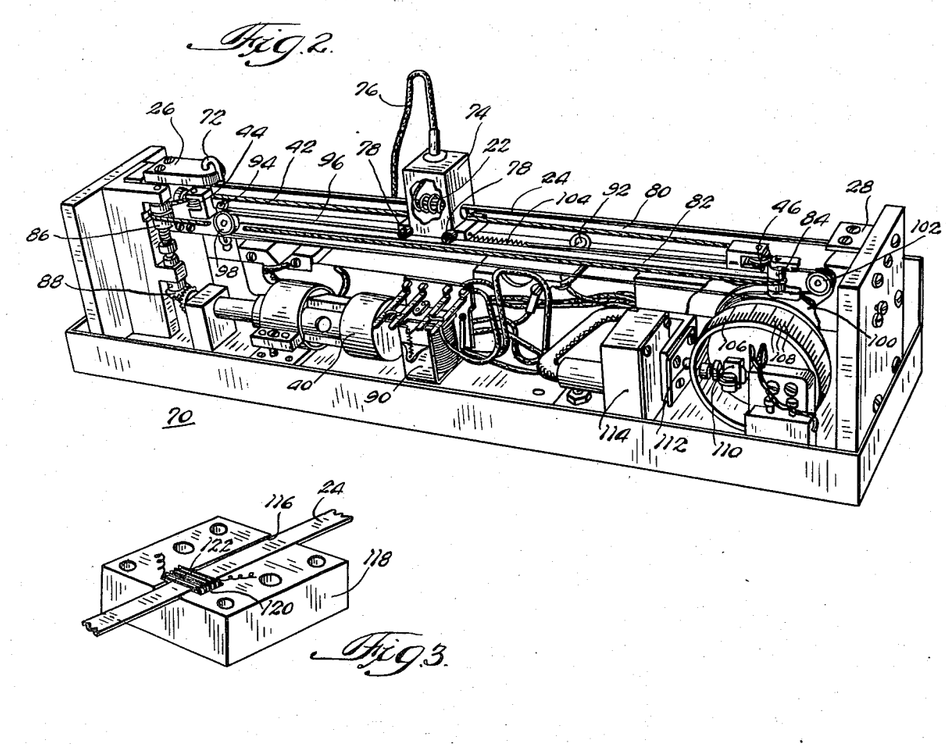
Fig. 2 is an illustration in perspective of the physical construction of a part of the embodiment of Fig. 1.
Fig. 3 is a partial enlarged view of the sonic delay line and one of the coils provided for energization thereof.

Fig. 2 illustrates the physical construction of the sonic line portion of the embodiment of Fig. 1. The chassis 70 includes the sonic line 24, the drive motor 40, and the coils 22. The fixed coil 30, the position pulse generator 52, and the limit switches 48 and 50 also are included on chassis 70 but are not shown in Fig. 2. The delay line 24 is shown extending between the acoustically damped mounting brackets 26 and 28. The fixed coil 30 is contained within an extension of the mounting bracket 26 and cannot be seen in Fig. 2. Associated with the fixed coil 30 is a polarizing horseshoe magnet 72 which magnetically polarizes the magnetostrictive line to a flux density at which the maximum magnetostrictive effect occurs. The scanning coil 22 is mounted in a housing 74 and is energized through a flexible cable 76 which leads to the associated electrical circuitry shown in Fig. 1. The housing 74 is mounted on a plurality of rollers 78 which rest on a pair of parallel spaced tracks 80 and 82. Additional rollers, not shown in Fig. 2, are disposed on the opposite side of the housing 74 and underneath the tracks 80 and 82 whereby the apparatus may operate in any position. Housing 74 is driven longitudinally along the tracks 80 and 82 by a flexible cord 42. The cord 42 is mounted between a pair of idling pulleys 44 and 46 and a second set of offset pulleys 84 and 86. Offset pulley 84 idles while pulley 86 constitutes the driving means and is connected through bevel gears 88 to the shaft of the drive motor 40. In one embodiment of this invention the drive motor 40 is a 28 volt D.C. motor and has associated therewith a reversing relay 90.

The reversing relay 90 is actuated by engagement of the housing 74 with a roller 92 connected to a switch not visible in Fig. 2 to return the housing to its starting position. The relay will normally be provided with a holding circuit. Similarly a roller 94 at the opposite extreme of housing travel is engageable by the housing 74 to effect deenergization of the switching relay 90 by breaking the holding circuit, and to effect reversal of motor 40 to begin a subsequent measuring cycle. A series resistance is provided in series with the motor 40 during forward travel of the housing 74, i.e. from left to right in Fig. 2 and is removed from the circuit upon return of the housing to the starting position. This provides a predetermined scanning speed of the housing during forward motion and a rapid return to the starting position upon completion of a measuring cycle. The readout of the decade counter 60 (Fig. 1) occurs during this return cycle but this may be accomplished in a very short time, substantially less than the fastest possible return of the housing.

A second flexible cord 96 is connected to the housing 74. It is fixed to the rearward end of housing 74, extends over a pulley 98, encompasses a drum 100 which is of substantial diameter, passes over a second idling pulley 102, and is connected to the forward end of housing 74 through a coil spring 104. The cord 96 is of some inelastic material such as fiber glass whereby the position of the housing 74 bears an accurately determined instantaneous relationship to the angular position of the drum 100 and a transparent drum 106 coaxially mounted therewith.

The transparent drum 106 has a plurality of opaque indicia 108 impressed thereon which are accurately spaced about the periphery so that a light sensitive sensing means may be provided to generate an impulse each time one of said indicia passes thereby. It will be clear, of course, that each indicia may represent an incremental length of time and an incremental unit of altitude.

In this embodiment a lamp 110 is mounted within the transparent drum 106 and passes a beam of light therethrough which is focused by lens 112 onto the light-sensitive element of a photo-conductive cell contained within the housing 114. In one embodiment of this invention the entire physical apparatus just described has an overall length of approximately 17 inches and a rectangular cross section of approximately 3 x 4 inches and is a complete electromechanical transducer and interval timer. The range of intervals which can be accommodated is a function of the travel of the housing 74, and in this embodiment varies from a fraction of a microsecond to several hundred microseconds.

Previous experimenters have found the use of magneto-strictive lines to be difficult or impossible for accurate delay purposes because of the difficulty of producing an adequate impulse in the line with a sufficiently steep wave front to give good resolution. By this invention a magnetostrictive line and a pair of associated coils is provided which is capable of producing an output in the sensing coil of substantially more than one volt. As shown in Fig. 3 this desirable output is provided by the use of a flat magnetostrictive element 24 having a rectangular cross section of approximately 3 x 4 inches and The line rests in a groove 116 formed in an insulating block 118 which is mounted either in the housing 74 for the scanning coil or the mounting 26 for the fixed coil. A small recess 120 is formed in the block 118 to receive the coil 122 which comprises a single helical layer of very few turns. Applicant found that the use of a large number of turns formed in a plurality of helical layers produced no increased output over that of the coil shown but merely increased the impedance of the device as well as the stray magnetic effects. A relatively small number of turns closely spaced was found desirable, the number of turns generally being between three and ten.

Figure 4:
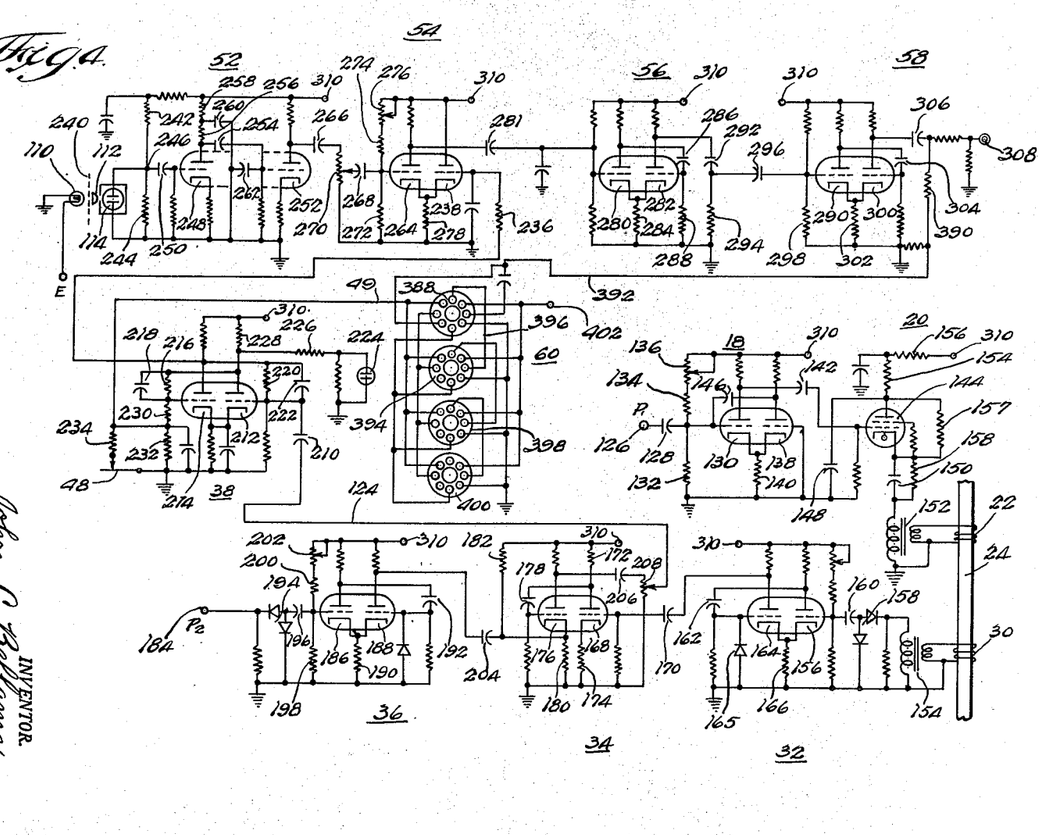
Fig. 4 is a detail circuit diagram of the embodiment of Fig. 1.

The complete circuit diagram of the embodiment of Fig. 1 is shown in Fig. 4. This includes the pulse generator 52, the position pulse gate 54, the squaring circuit 56 and the position pulse forming circuit 58, all of which comprise the pulse counting circuit. The output of this series of devices is fed to the counters 60 to record the number of pulses generated between the initiation of the scan and the instant of coincidence between the reflected and delayed impulses. The $P_1$, or transmitted impulse, trigger 18, energizes the sonic line driver 20 which produces the mechanical impulse in the line 24. The delayed output trigger 32 for producing a delayed pulse $P_1'$ is shown coupled to the line 24 and providing a signal to one grid of the coincidence gate 34. The $P_2$, or received impulse, trigger 36 is shown providing an impulse to the cathode circuit of the coincidence gate 34. When the coincidence gate receives the two impulses, i.e. $P_1'$ and $P_2$, in synchronism it applies a voltage through the conductor 124 to shift the binary switch 38 and sharply change the bias on the gated amplifier 54 in the position pulse circuit.

Sonic line driver

A negative impulse is provided at the input terminal 126 of trigger 18 which corresponds to the transmitted radio impulse in the embodiment of Fig. 1. This impulse is applied through condenser 128 to the control grid of a triode 130 which is normally biased to a predetermined positive value determined by the voltage divider including resistors 132 and 134 and adjustable resistor 136. A second triode 138 has a cathode resistor 140 in common with triode 130 and inasmuch as current normally is flowing through triode 13, a positive voltage exists at the cathodes. The potential on the grid of triode 130 is determined, in part, by the circuit branch including condenser 146 coupled between the plate of triode 138 and the grid of triode 130.

The negative impulse supplied to the grid of triode 130 reduces the current flow therethrough which produces a positive impulse at the plate of that tube. This impulse is applied to the control grid of a gas filled trigger tube 144 through condenser 142 which becomes conductive when the impulse reaches a predetermined magnitude. The reduced current in triode 130 also reduces the voltage drop in cathode resistor 140, thus effectively making the grid of the tube 138 assume a more positive potential, increasing the current flow therethrough, and producing a negative impulse at the plate of triode 138 which is fed back through condenser 146 to produce an increased negative voltage on the grid of triode 130, thereby causing current flow to cease very rapidly and initiating a conventional flip-flop cycle as is customary in a conventional Eccles-Jordan circuit. The output of the input trigger 18 is a substantially square wave having an extremely short rise time of the order of .5 microsecond and any desired duration as determined by the circuit parameters. An important function of trigger 18 is to reject spurious weak signals, and to initiate operation of the driver 20 only when the transmitter impulse rises to a predetermined magnitude.

The positive impulse applied to the gas tube 144 in driving circuit 20 causes said tube to conduct, permitting the discharge of a condenser 148 through the tube 144, a series condenser 150 and the primary winding of the pulse transformer 152. The condenser 150 is of substantially smaller value than condenser 148 whereby the condenser 150 will quickly assume a charge substantially equal to the voltage initially applied to condenser 148 and will thus reduce the potential appearing across gas tube 144 below that necessary to maintain ionization therein. The gas tube will thus be extinguished and no further current will flow in the primary of pulse transformer 152. A sharp current impulse in transformer 152 is thus provided. The condenser 148 will be recharged through plate resistors 154 and 156 to a value determined by the magnitude of resistors 154, 156 and 157. Receipt of subsequent impulses from the trigger 18 will again discharge the condenser 148 through condenser 150 and transformer 152. After each impulse, condenser 150 is discharged through resistor 158, The pulse transformer 152 provides an approximate impedance match between the secondary thereof, having few turns, and the output coil 22 which is wound about the magnetostrictive line 24. Thus a pulse is initiated in the line each time a radio impulse is sent out by transmitter 12. These pulses are so spaced in time that only one impulse is on the line at any time.

*Delayed output trigger*

The impulses are sensed by coil 30 which is connected to the low impedance secondary of the pulse transformer 154. The primary of pulse transformer 154 is connected between ground and the grid of a triode 156 forming the first stage of the output trigger 32. As the voltage generated in the secondary of pulse transformer 154 is in the nature of a damped sinusoid, the network of crystal rectifiers 158 is required to eliminate the positive half cycle and to apply the negative half cycle to the control grid of triode 156 only when it exceeds a predetermined minimum. Triode 156 amplifies the delayed pulse and the output thereof is applied from the plate through condenser 162 to the grid of triode 164. For a negative impulse on the input of the trigger 32 an amplified positive impulse is now applied to the grid of triode 164 whereby conduction is increased therein causing the plate thereof to become more negative and the cathode thereof to become more positive. Triodes 156 and 164 have a common cathode resistor 166 and thus the positive impulse of voltage appearing at the cathode of triode 164 is fed back to effectively drive the input grid of tube 156 more negative, the phenomenon increasing until tube 156 reaches cutoff, after which the circuit relaxes to its monostable condition. This circuit is very similar to the input trigger 18 described above and will produce an accurately timed output pulse having a steep wave front and a generally square shape. The diode 165 is included in the grid circuit of triode 164 to insure complete recovery between impulses whereby the response level is independent of repetition rate.

*Coincidence gate*

This impulse is applied through the condenser 170 to the grid of triode 168 which forms a part of the coincidence gate 34. Triode 168 is connected in a conventional amplifier circuit and has a plate resistor 172 and a cathode resistor 174 associated therewith. The output of this stage is taken at the plate of triode 168 and applied to the control grid of triode 176 through a coupling condenser 178. The triode 176 has a cathode resistor 180 of substantial magnitude, and a resistor 182 of larger magnitude is connected from the cathode to the source of positive voltage. Thus the cathode is normally maintained at a substantial positive voltage, namely, in the order of 70 volts. The tube is therefore biased substantially into the cutoff region and even a large impulse applied to the control grid thereof is not sufficient to cause conduction.

*P₂ input circuit*

An impulse corresponding to the received reflected radio signal is applied to the terminal 184 of the P₂ input trigger 36. The trigger 36 is substantially identical to the delayed output trigger 32 described above and employs a pair of triodes 186 and 188 having a common cathode resistor 190 and a coupling condenser 192 connected between the plate of triode 186 and the grid of triode 188. This circuit functions as a monostable triggered circuit in which the input signal is applied to the grid of triode 186 through a crystal diode network 194 adapted to remove the positive half cycle and to pass the negative half cycle through coupling condenser 196 only when it exceeds a predetermined minimum value. The grid of triode 186 is normally maintained at a somewhat positive potential by the voltage divider which includes the resistors 198 and 200 and variable resistor 202. Receipt of a negative impulse sufficient to overcome the initial forward resistance of the diode rectifier will apply an impulse to the grid of tube 186 decreasing the conduction therein, making the voltage at the cathode more negative. This increases the conduction in tube 188, making that plate become more negative, providing a shaped accurately timed trigger impulse.

The output of trigger 36 is taken at the plate of triode 188 and applied through coupling condenser 204 to the cathode of triode 176 which forms a part of coincidence gate 34. The negative impulse applied to the cathode of triode 176 is not sufficient to reduce the grid-to-cathode potential to a magnitude permitting conduction unless the timing of the impulse coincides with an impulse received from the P₁' trigger 32. If the impulses coincide the triode 176 momentarily conducts, causing the plate thereof to experience a negative excursion which is applied through condenser 206, potentiometer 208 and coupling condenser 210 to the grid of triode 212 which forms a part of the binary switch 38.

*Binary switch*

The binary switch 38 is a conventional bistable circuit using two triodes 212 and 214 with the respective grids and cathodes resistance coupled. When a measuring cycle is started the reset switch 48 is momentarily opened causing the triode 214 to conduct and the triode 212 to be maintained in a nonconducting state. Upon receipt of the output voltage impulse from the coincidence gate 34, which is generated by the coincident application of impulses from triggers 32 and 36, a positive impulse is applied to the grid of triode 212 causing that tube to conduct. The plate voltage thus becomes more negative and this negative voltage is applied to the control grid of triode 214 through the network comprising resistor 216 and condenser 218. This negative voltage reduces the conduction in triode 214 causing the plate thereof to become more positive, the plate voltage being fed back through resistor 220 and condenser 222 to the input grid of triode 212. The phenomenon just described comes to an end when tube 212 is in full conduction and tube 214 is maintained at cutoff. A neon diode 224 is provided in the plate circuit of tube 212 and indicates conduction in said tube. A series resistor 226 limits the current flowing in tube 224. A voltage divider consisting of plate resistor 228, coupling resistor 216 and grid resistors 230 and 232 normally will maintain the grid of triode 214 at an effective negative voltage close to the cutoff value. The resistor 232 is of substantial magnitude, in one embodiment of this invention 68,000 ohms, while the resistor 234 connected in parallel therewith and in series with switch 48 is extremely small, of the order of 100 ohms. Thus when switch 48 is opened the grid of triode 214 is shifted to a more positive value causing slight conduction in the triode 214 which, through the feedback circuits above described, resets the binary switch 38 with the tube 214 in full conduction and the tube 212 at cutoff.

*Gated amplifier*

The output of binary switch 38 is taken at the plate of triode 214 and applied through an isolating resistor 236 to the grid of a triode 238 which is connected in a cathode follower circuit and forms a part of the gated amplifier 54. Thus the grid of tube 238 is maintained at a substantial negative voltage subsequent to the opening of reset switch 48 and prior to the receipt of an impulse from the coincidence gate 34. Upon receipt of an impulse from the coincidence gate 34 the binary switch shifts and the signal on the grid of triode 238 is switched to a substantial positive value. The purpose of this phenomenon will be clear from the description to follow of the position pulse generating system.

*Position pulse generator*

The pulse generator 52 is mechanically coupled to the movable coil 22 (Fig. 1) as described supra. The movable element in the pulse generator is the transparent drum 106 (Fig. 1) having a plurality of evenly spaced indicia thereon. The indicia are schematically shown in Fig. 4 as a vertical row of spaced lines 240. The light source 110 is energized from any convenient source and produces a beam through lens 112 which falls on photoconductive cell 114. The moving transparent drum having the indicia 240 thereon intermittently modulates the light beam to produce spaced impulses of light on the photoconductive tube 114. A voltage of predetermined value is impressed on the tube 114 through the voltage divider comprising resistors 242 and 244. The cell 114 is connected in parallel with resistor 244. Thus, the effective resistance of the parallel combination is increased whenever an opaque portion of the drum passes between the light and the cell. This produces a positive voltage excursion at the point 246 which is applied to the control grid of amplifying triode 248 through coupling condenser 250. The output of amplifying triode 248 is taken at the plate thereof and applied to the grid of a second amplifying triode 252 through coupling condenser 254. The bypass condensers 260 and 262 function to reduce the noise response and to improve the shape of the output pulses. The output of triode 252 is applied to the gated amplifier 54 at the control grid of triode 264 through coupling condensers 266 and 268 and an amplitude controlling potentiometer 270. The grid of triode 264 is normally maintained at a predetermined positive potential by the voltage divider which includes resistors 272 and 274 and adjustable resistor 276 while the cathode thereof is connected to cathode resistor 278 in common with the cathode of triode 238. As described above, the grid of tube 238 is maintained at an effective negative voltage between the time that the reset switch 48 is opened and the coincidence gate indicates the end of the measuring cycle. At the end of such a cycle the binary switch 38 is shifted, producing a substantial positive voltage on the grid of triode 238. Thus the cathode of tube 264 is maintained at a very small positive voltage during the period when the grid of tube 238 is negative, while the cathodes are at a substantial positive potential following the measuring cycle when the grid of tube 238 is positive. Thus the triode 264 is appropriately biased to pass signals during the measuring cycle but will not pass the impulses after the coincidence gate indicates the end of the measuring cycle. During the measuring cycle triode 264 amplifies the impulses of the position pulse generator and these pulses are applied through coupling condenser 281 to the grid of a triode 280 which forms a part of the squaring circuit 56.

*Position pulse shaping circuits*

The squaring circuit 56 is a quasi-bistable circuit in that it employs a long time constant network including condenser 286 and resistor 288 coupling the output of triode 280 ot the grid of triode 282. Triodes 280 and 282 have a common cathode resistor 284 providing positive feedback to the input triode 280. In one embodiment of this invention the long time constant coupling network comprises a coupling condenser 286 having a value of .01 mfd. and a resistor 288 connected from the grid of triode 282 to ground having a value of ten megohms. Thus for any repetition rate of input signal greater than a few cycles per second the circuit will not be self-relaxing but will function in a bistable manner. Noise signals and irregularities in the wave shape of impulses are thus eliminated from the output. For negative impulses applied to the grid of tube 280, positive impulses appear at the plate of said tube which are applied through coupling condenser 286 to the grid of triode 282 and, as already described, the cathode potential is thus raised, providing an effective negative voltage feedback to the grid of tube 280.

The output of squaring circuit 56 is applied from the plate of triode 282 to the grid of triode 290 which forms a part of the pulse forming circuit 58. The output of squaring circuit 56 is applied to the pulse forming circuit 58 through a differentiating network comprising condenser 292 and resistor 294 and a coupling condenser 296. The grid of triode 290 is connected to ground through resistor 298. The pulse forming circuit 58 is very similar to the squaring circuit just described having two triodes 290 and 300 connected to a common cathode resistor 302 to produce positive feedback between the tubes and a coupling condenser 304 to produce positive coupling between the plate of triode 290 and the grid of triode 300. While squaring circuit 56 generates impulses having steep wave fronts and a generally square shape, the exact duration of the output impulse is somewhat dependent on the noise and character of the incoming signal. The pulse forming circuit 58 is energized by a steep wave front impulse from the differentiating network and generates uniform pulses as its output. The output of pulse forming circuit 58 is applied through coupling condenser 306 to either a decade counter system such as that indicated schematically by counters 60 or to a printing recorder at the terminal 308. Any one of a plurality of well known recorders may be employed to make a permanent impression of the number of impulses received and one particularly useful recorder for this purpose is the unitary decimal digital recorder described in my copending application Serial No. 367,326, entitled System, Method and Apparatus for Data Processing.

In all of the circuits above described it will be clear that conventional connections are provided unless otherwise specifically described. In particular a plate resistor is normally provided between the plate of each vacuum tube and a source of positive voltage indicated by the small terminal 310. Furthermore all of the cathodes or cathode resistors are connected to a common ground which comprises the negative terminal of the same source of D.C. voltage. Resistors are connected between all of the grids and ground in the conventional and well known manner. In several of the plate circuits two serially connected plate resistors are provided with a condenser connected between the common terminal thereof and ground. This is a customary method of isolating the various stages to prevent feedback to the common voltage source. The counters 60 will provide a visual indication of the data registered and will be reset for subsequent use at the beginning in each cycle by the opening of limit switch 48 connected to the counters 60 through conductor 49. While any one of many available counters may be employed, the one schematically shown in Fig. 4 is a four decade neon diode ring counter of conventional design. The units decade 388 registers each impulse applied thereto from the output of pulse forming circuit 58 through resistor 390 and conductor 392. Upon receipt of ten impulses, the units counter 388 applies a single impulse to the tens counter 394 through conductor 396, and the hundreds and thousands counters 398 and 400 operate in a similar manner. The readout impulses are applied to terminal 402 which energizes all of the decades in parallel.

*Magnetostrictive oscillator*

Figure 5:
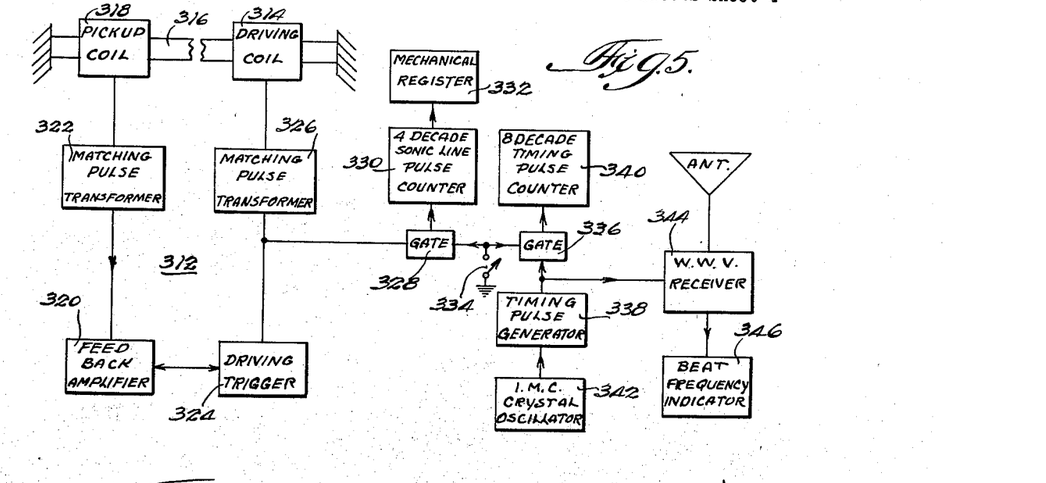
Fig. 5 is a block diagram of an alternate embodiment of this invention utilizing the sonic delay line of Figs. 2 and 3.
Figure 6:
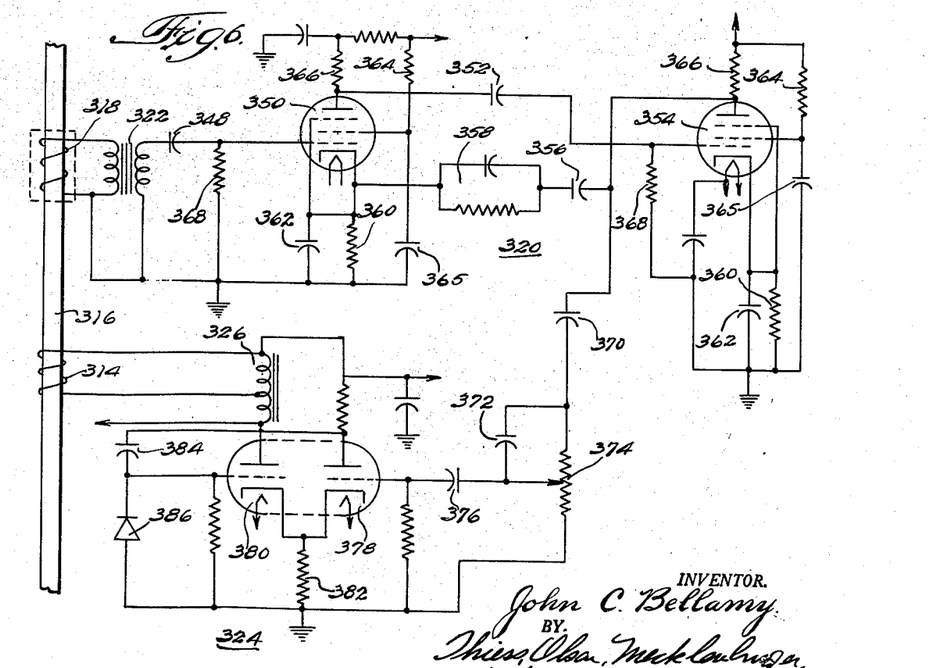
Fig. 6 is a detail circuit diagram of the embodiment of Fig. 5.

An alternate embodiment of this invention is illustrated in Figs. 5 and 6 in which the novel magnetostrictive line and coupling coils of this invention are employed in a follow-up system for use as an accurate pulse generator operating over a wide frequency range. The driving coil 314 is energized to produce a mechanical vibration in the magnetostrictive line 316 which propagates along the length of said line and excites an output current in the pickup coil 318. The coil 318 energizes a feedback amplifier 320 through a matching pulse transformer 322. The feedback amplifier 320 in turn triggers a driver 324 which applies an additional impulse to the driving coil 314 through pulse transformer 326. It has been found that an oscillator constructed in accordance with this invention has higher stability than is normally available in oscillators which are adjustable over a wide frequency range. The oscillator illustrated in Fig. 5 is adjustable to a predetermined frequency by shifting the relative positions of the driving and pick-up coils 314 and 318. Periodicities ranging between approximately .1 microsecond and several hundred microseconds are available in one embodiment of this invention while any frequency range may be covered by appropriate modifications. The remainder of the apparatus illustrated in Fig. 5 is adapted for calibration of the oscillator above described. The output pulses of the driving trigger 324 are applied to a gate 328 which, when open, passes the impulses to a four decade counter 330. If the number of impulses recorded exceeds the capacity of the four decade counter the output thereof is adapted to actuate a mechanical register 332 for each complete cycle of counter operation. The gate may be of conventional construction similar to the various electronic gates described with respect to Fig. 4. The gate is opened by the closure of single pole switch 334 which also opens a second gate 336 to pass signals from a timing pulse generator 338 to an eight decade timing pulse counter 340. The timing pulse generator 338 is preferably crystal controlled by a one megacycle crystal 342. Thus by closing the switch 334 and maintaining it closed for a preselected period the exact length of said period will be indicated on the eight decade counter 340 to an accuracy of one microsecond. The four decade counter 330 will record the impulses of the oscillator 312 for the same period and the ratio of the two recorded values will accurately indicate the frequency of the oscillator. A means for checking the accuracy of the timing pulse generator 338 is also shown schematically in Fig. 5. This apparatus applies the output of the timing generator 338 to a radio receiver 334 which is tuned to Station WWV transmitting an accurately controlled one megacycle signal. By registering the beat frequency between the output of the generator 338 and the radio signal, a very accurate indication of the exact frequency and accuracy of the crystal controlled oscillator is provided. This may be registered on a beat frequency indicator 346 which may either be an ammeter which is responsive to low audio frequencies or may be a counting mechanism.

The detailed circuitry of the oscillator portion of Fig. 5 is represented in Fig. 6. The driving trigger 324 comprises a triode 380 having the matching pulse transformer 326 connected in the plate circuit thereof. The matching transformer 326 is connected as an auto-transformer with a small number of the turns thereof adapted to energize the driving coil 314. The driving coil 314 imposes a sonic impulse on magnetostrictive line 16 and the sonic impulse is propagated down the line to generate a current in the pickup coil 318. Coil 318 is connected to the primary of a pulse matching transformer 322, the secondary of which is coupled through condenser 348 to the control grid of a pentode 350 forming a part of feedback amplifier 320. The output of pentode 350 is taken at its plate and applied through coupling condenser 352 to the control grid of a second pentode 354. The output of pentode 354 in turn is taken at the plate and applied through coupling condenser 356 and network 358 to the cathode of the first amplifier pentode 350. This comprises a negative feedback network insuring greater stability and rejection of spurious signals in the output. Both of the amplifying stages are of conventional form having a cathode resistor 360 and bypass condenser 362, a screen grid resistor 364, a screen grid bypass condenser 365, a plate resistor 366 and a grid return resistor 368.

The output of pentode 354 is also applied through coupling condenser 370, a network including condenser 372, potentiometer 374, and a coupling condenser 376 to the grid of a triode 378 forming a part of driving trigger circuit 324. Driving trigger circuit 324 is identical to the input triggers of the embodiment of Fig. 1 in which the triodes 378 and 380 act as a monostable triggered circuit. The cathodes of these tubes have a common resistor 382 providing feedback between the stages, and the plate of triode 378 is coupled to the grid of triode 380 through condenser 384. A diode 386 is connected between the grid of tube 380 and ground to remove the negative half cycle of the coupled voltage and thus insure sharp triggering of the circuit and a single output pulse by eliminating any flywheel effect. Thus under quiescent conditions tube 380 will be conducting, while tube 378 will be nonconducting and upon receipt of an impulse at the grid of tube 278 a sharply defined positive impulse will be generated in the plate circuit of tube 380. As described above this effect is a conventional flip-flop action whereby a sharply defined voltage impulse having short rise and decay time is applied to the pulse transformer 326. The impulse thus generated will produce a second sonic effect in the line 316 and the circuit will be self-sustaining as an oscillator provided only that the gain of the various stages is greater than the attenuation in the coupling circuits and the sonic line. The system above described is highly useful as a wide range variable oscillator principally a result of the unique design for a sonic line and coupling coils as described in this invention. However, various of the circuits and apparatus taught by this invention provide additional advantages not available heretofore, and comprise means for the accomplishment of the object of this invention whether employed singly or as a complete system.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Apparatus for determining distance comprising source means for transmitting electromagnetic radiation to a distant target, receiver means for detecting reflected radiation from said target, an elongate magnetostrictive element, input means for impressing a series of timed sonic impulses on said element, the timing of said impulses bearing a known relationship to a detectable characteristic of said radiation, sensing means cooperating with said element to detect the passage of said impulses thereby, motive means for continuously varying the relative positions of said input and said sensing means, and means for detecting coincidence between the detected impulse in said sensing means and the detectable characteristic of said radiation in said receiver means.

2. Apparatus for determining distance comprising source means for transmitting electromagnetic radiation to a distant target, receiver means for detecting reflected radiation from said target, an elongate magnetostrictive element, input means for impressing a series of timed sonic impulses on said element, the timing of said impulses bearing a known relationship to a detectable characteristic of said radiation, sensing means cooperating with said element to detect the passage of said impulses thereby, motive means for continuously varying the relative positions of said input and said sensing means, means for determining the distance between said input means and said sensing means, and means for detecting coincidence between the detected impulse in said sensing means and the detectable characteristic of said radiation in said receiver means.

3. Apparatus for determining distance comprising source means for transmitting electromagnetic radiation to a distant target, receiver means for detecting reflected radiation from said target, an elongate magnetostrictive element, input means for impressing a series of timed sonic impulses on said element, the timing of said impulses bearing a known relationship to a detectable characteristic of said radiation, sensing means cooperating with said element to detect the passage of said impulses thereby, means for relatively varying the position of said sensing means and said input means longitudinally along said element in a reciprocatory manner, means for detecting coincidence between the detected impulse in said sensing means and the detectable characteristic of said radiation in said receiver means, and means for generating a series of timed impulses controlled by the relative positions of said sensing means and said input means, the number of impulses bearing a known relationship to the relative position of said input means and said sensing means.

4. Apparatus for determining distance comprising source means for transmitting spaced impulses of electromagnetic radiation to a distant target, receiver means for detecting reflected radiation from said target, an elongate magnetostrictive element, input means for impressing a series of timed sonic impulses on said element, the timing of said impulses bearing a known relationship to the initiation of said radiation impulses, sensing means cooperating with said element to detect the passage of said impulses thereby, motive means for varying the relative positions of said sensing means and said input means longitudinally along said element in a reciprocatory manner, means for detecting coincidence between the detected impulse in said sensing means and a corresponding detected impulse in the receiver means, and means for generating a series of timed impulses controlled by the relative positions of said sensing means and said input means, the number of impulses bearing a known relationship to the relative position of said input means and said sensing means.

5. Apparatus for determining distances comprising source means for transmitting a series of impulses of electromagnetic radiation to a distant target, receiver means for detecting reflected radiation from said target, an elongate magnetostrictive element, a fixed coil of insulated electrical conductor on said element, a movable coil of insulated electrical conductor on said element, means for generating a series of electrical impulses in one of said coils in synchronism with the series of radiation impulses, means for sensing a series of impulses generated in the other of said coils, coincidence means for determining the time relationship between each of the impulses detected by said receiver means and the corresponding impulse detected by said sensing means, and means for moving said movable coil along the length of said element in a reciprocatory manner, the periodicity of said movement determining the frequency of the distance determinations.

6. Apparatus for determining time intervals comprising an elongate magnetostrictive element, input means for impressing a series of timed sonic impulses on said element, sensing means cooperating with said element to detect the passage of said impulses thereby, means for generating a second series of impulses spaced in time from said sonic impulses by said interval, motive means for continuously relatively moving said sensing means and said input means, and means for detecting coincidence between one of said second series of impulses and a corresponding one of the detected impulses in said sensing means.

7. Apparatus for determining time intervals comprising an elongate magnetostrictive element, input means for impressing a series of timed sonic impulses on said element, sensing means cooperating with said element to detect the passage of said impulses thereby, means for generating a second series of impulses spaced in time from said sonic impulses by said interval, said interval being less than the repetition rate of said impulses, motive means for continuously relatively moving said sensing means and said input means, and means for detecting coincidence between one of said second series of impulses and a corresponding one of the detected impulses in said sensing means.

8. Apparatus for determining time intervals comprising an elongate magnetostrictive element, input means for impressing a series of timed sonic impulses on said element, sensing means cooperating with said element to detect the passage of said impulses thereby, means for generating a second series of impulses spaced in time from said sonic impulses by said interval, said interval being less than the repetition rate of said impulses, motive means for continuously relatively moving said sensing means and said input means, and means for detecting coincidence between one of said second series of impulses and a corresponding one of the detected impulses in said sensing means, the ratio of the length of said element to the sonic propagation velocity therealong being equal to the maximum time interval to be determined.

9. Apparatus for measuring a time interval comprising: an elongated member made of magnetostrictive material; first and second means electromagnetically coupled to the said member for inducing and sensing, respectively, sonic impulses in the said member; means coupled at least to one of the said first and second means for producing relative displacement between the last two mentioned means at the beginning of a time interval to be measured; means coupled at least to one of the said first and second means for producing an electrical signal continually representing the magnitude of the said displacement; means coupled to the said signal-producing means for indicating perceptibly the instantaneous magnitude of the said displacement; and means coupled to the said displacement-signal producing means for rendering the last-mentioned means ineffective at the end of the time interval to be measured.

10. Apparatus for measuring time intervals comprising: an elongated magnetostrictive element; first means for generating electrical signals representing, respectively, the beginning and the end of a time interval to be measured; second means coupled to the said first means, coupled electromagnetically to the said element, and responsive to the said interval-beginning signal for impressing a sonic impulse on the said element; third means coupled electromagnetically to the said element and responsive to the said impressed sonic pulse to develop an electrical output signal; fourth means coupled at least to one of the said second and third means for continuously changing the linear displacement between the two last-mentioned means; and fifth means coupled to the said first and third means and responsive to the said electrical interval-end and output signals to produce a perceptible representation of a quantity having at least a predetermined functional relationship to the magnitude of the said linear displacement existing whenever the two last-mentioned signals occur substantially simultaneously.

11. Apparatus for measuring time intervals as represented in claim 10 wherein the said second and the said third means each comprise: a coil having no more than ten turns on an elongated electrical conductor wound helically in a single layer around the said element; and means electrically insulating the said coil from the said element.

12. Appartus for measuring time intervals as represented in claim 10 wherein the said first means comprises a transmitter of radiant energy for developing a first electrical-energy pulse demarking the beginning of the said time interval, and a receiver operative in response to radiant energy transmitted from the said transmitter for developing a second electrical-energy pulse demarking the end of the said time interval.

13. Apparatus for measuring time intervals as represented in claim 12 wherein the said first means further comprises: a first trigger circuit coupled between the said radiant-energy transmitter and the said second means for producing an electrical interval-beginning signal of predetermined shape, magnitude, and duration substantially simultaneous with, and in response to, the said first electrical-energy pulse; and a second trigger circuit coupled between the said receiver and the said fifth means for producing an electrical interval-end signal of predetermined shape, magnitude, and duration substantially simultaneous with, and in response to, the said second electrical-energy pulse.

14. Apparatus for measuring intervals of time as represented in claim 10 wherein the said fifth means comprises: a pulse generator coupled to the said fourth means for generating a time-series of electrical pulses numerically proportional to the instantaneous linear displacement existing between the said second and third means; means coupled to the said electrical pulse generator for perceptibly indicating a quantity at least functionally predetermined by the number of the said time-series pulses and, hence, by the said linear displacement; and means coupled to the said pulse generator and to the said first and third means for discontinuing the effect of the said pulse generator on the said indicating means whenever the said interval-end and output signals are substantially coincident in time.

15. Apparatus for measuring time intervals as represented in claim 14 wherein the said fourth means further comprises means for mechanically displacing at least one of the said second and third means reciprocally along a substantial portion of the length of the said element.

16. Apparatus for measuring time intervals as represented in claim 15 further comprising means for initiating operation of the said pulse generator whenever the linear displacement between the said second and third means is at a minimum.

References Cited in the file of this patent

UNITED STATES PATENTS

| | | |
|---|---|---|
| 2,063,948 | Pierce et al. | Dec. 15, 1936 |
| 2,113,365 | Artzt | Apr. 5, 1938 |
| 2,401,094 | Nicholson | May 28, 1946 |
| 2,434,255 | Bond et al. | Jan. 13, 1948 |
| 2,502,464 | Lehmann | Apr. 4, 1950 |
| 2,566,189 | Gloess | Aug. 28, 1951 |
| 2,696,560 | Roberts | Dec. 7, 1954 |
| 2,759,102 | Burns | Aug. 14, 1956 |